United States Patent
Patel et al.

(10) Patent No.: US 12,266,181 B2
(45) Date of Patent: Apr. 1, 2025

(54) TEXT-BASED FRAMEWORK FOR VIDEO OBJECT SELECTION

(71) Applicant: Adobe Inc., San Jose, CA (US)

(72) Inventors: Shivam Nalin Patel, Mountain View, CA (US); Kshitiz Garg, Santa Clara, CA (US); Han Guo, San Jose, CA (US); Ali Aminian, San Jose, CA (US); Aashish Misraa, San Jose, CA (US)

(73) Assignee: Adobe Inc., San Jose, CA (US)

( * ) Notice: Subject to any disclaimer, the term of this patent is extended or adjusted under 35 U.S.C. 154(b) by 739 days.

(21) Appl. No.: 17/531,568

(22) Filed: Nov. 19, 2021

(65) Prior Publication Data

US 2023/0162502 A1    May 25, 2023

(51) Int. Cl.
| | |
|---|---|
| G06V 20/40 | (2022.01) |
| G06F 18/214 | (2023.01) |
| G06F 18/23 | (2023.01) |
| G06F 18/25 | (2023.01) |
| G06F 40/205 | (2020.01) |

(52) U.S. Cl.
CPC ............ G06V 20/49 (2022.01); G06F 18/214 (2023.01); G06F 18/23 (2023.01); G06F 18/251 (2023.01); G06F 40/205 (2020.01); G06V 20/46 (2022.01)

(58) Field of Classification Search
CPC ...... G06V 20/49; G06V 20/46; G06F 40/205; G06F 18/214; G06F 18/23; G06F 18/251
See application file for complete search history.

(56) References Cited

PUBLICATIONS

Hu, R., Rohrbach, M., & Darrell, T. (2016). Segmentation from natural language expressions. In Computer Vision-ECCV 2016: 14th European Conference, Amsterdam, The Netherlands, Oct. 11-14, 2016, Proceedings, Part I 14 (pp. 108-124). Springer International Publishing. (Year: 2016).*

McIntosh, B., Duarte, K., Rawat, Y. S., & Shah, M. (2020). Visual-textual capsule routing for text-based video segmentation. In Proceedings of the IEEE/CVF Conference on Computer Vision and Pattern Recognition (pp. 9942-9951). (Year: 2020).*

(Continued)

*Primary Examiner* — David Perlman
(74) *Attorney, Agent, or Firm* — Nicholson De Vos Webster & Elliott LLP

(57) ABSTRACT

Embodiments are disclosed for receiving a user input and an input video comprising multiple frames. The method may include extracting a text feature from the user input. The method may further include extracting a plurality of image features from the frames. The method may further include identifying one or more keyframes from the frames that include the object. The method may further include clustering one or more groups of the one or more keyframes. The method may further include generating a plurality of segmentation masks for each group. The method may further include determining a set of reference masks corresponding to the user input and the object. The method may further include generating a set of fusion masks by combining the plurality of segmentation masks and the set of reference masks. The method may further include propagating the set of fusion masks and outputting a final set of masks.

20 Claims, 12 Drawing Sheets
(3 of 12 Drawing Sheet(s) Filed in Color)

(56) References Cited

PUBLICATIONS

Khoreva, A. et al., "Video Object Segmentation with Language Referring Expressions," arXiv:1803.08006v3 [cs.CV], 2018, 24 pages.

Seo, S. et al., "URVOS: Unified Referring Video Object Segmentation Network with a Large-Scale Benchmark," Computer Vision—ECCV 2020: 16th European Conference, Proceedings, Part XV, Aug. 2020, pp. 208-223.

\* cited by examiner

TEXT-BASED FRAMEWORK FOR VIDEO OBJECT SELECTION

BACKGROUND

Object centric edits are some of the most common routine edits in a video editing workflow, however, object centric edits are also some of the most labor intensive work to accurately select an object. Tracking the selected object in a video presents further challenges due to the spatio-temporal nature of a video. The selected objects often warp, change scale, or have rapid motion blur due to fast motion of the object or a rapid scene change. Further, objects that are identified often appear and disappear during a scene and reidentifying the same object presents a challenge of accurately selecting the object at an additional time. These aspects degrade quality of object selection.

These and other problems exist with regard to object segmentation in electronic video systems.

SUMMARY

Introduced here are techniques/technologies that relate to video segmentation and object tracking in video scenes. A video segmentation system can receive a text input from a user of an intended edit to an input video scene. The video segmentation system can process the text input to determine a video edit for an object in the video scene. The video segmentation system identifies keyframes in the video scene that include the object and perform image segmentation and frame referring segmentation. The video segment system fuses the image segmentation with the frame referring segmentation to produce an output set of masks for the object in the input video.

Unlike conventional systems, where the object segmentation is performed with a predetermined segmentation mode, the techniques of the present disclosure provide a flexible framework for fusing multiple segmentation models to generate a robust text-based object segmentation during rapid scene changes, moving objects, and other difficult segmentation conditions.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying drawings in which.

DETAILED DESCRIPTION

One or more embodiments of the present disclosure include a video segmentation and object tracking in video scenes. A video segmentation system can receive a text input and an input video scene from a user of an intended edit to the input video scene. The video segmentation system can extract text features such as an object and an intended edit action from the text input. The video segmentation system determines a corresponding video edit for the object in the video scene. The video segmentation system identifies keyframes in the video scene that include the object and perform image segmentation and frame referring segmentation. The video segmentation system clusters groups of keyframes that include the object based on a number of keyframes and a threshold proximity of the group of keyframes. The video segmentation system fuses the image segmentation with the frame referring segmentation to produce an output set of fusion masks for the object in the input video. The video segmentation system applies the set of fusion masks to the input video scene. The video segmentation system outputs a masked video scene that includes the fusion masks as applied to the input video scene.

As discussed, conventional techniques lack the ability to perform accurate object segmentation especially for objects of interest that warp, change scale, or have rapid motion blur due to object motion or rapid scene change. As a result, conventional systems often fail to identify an object that appears and disappears during a scene accurately and requires video editor input to adjust a new segmentation each time the object appears/disappears. This creates an inconsistent segmentation and tracking of the object in the video scene.

To address these and other deficiencies in conventional systems, embodiments perform text-based video segmentation and object tracking in video scenes by fusing a set of frames that are processed by image segmentation with a set of frames that are processed by frame referring segmentation. This creates a more accurate object segmentation that tracks the object through the scene including during object motion and changes in object size, aspect ratio, or scaling factors. Although embodiments are generally described with respect to a single object in a video scene, embodiments may be used with any number of objects and text inputs.

Figure 1:
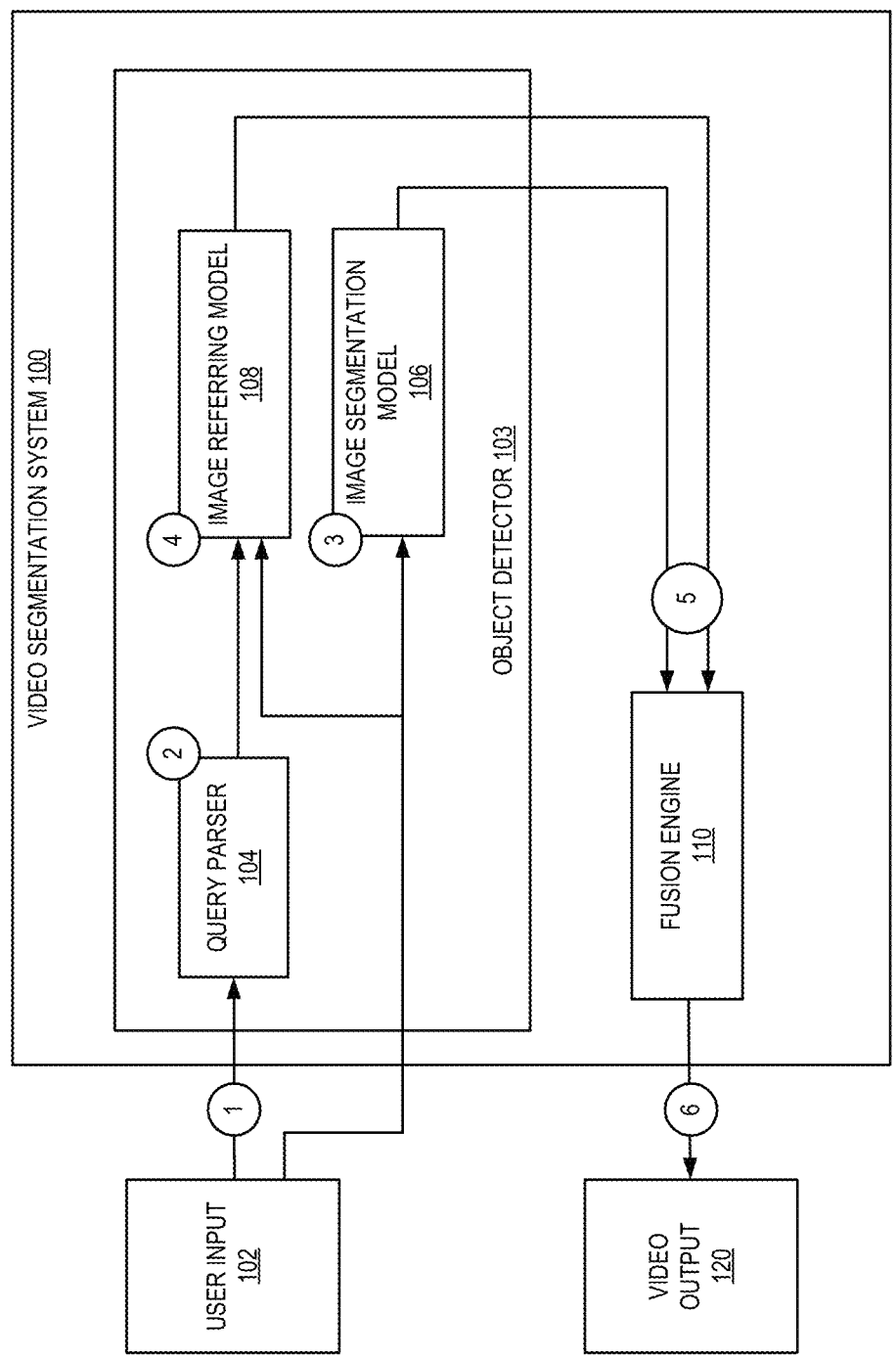
FIG. 1 illustrates a diagram of a process of text-based video object selection in accordance with one or more embodiments.

FIG. 1 illustrates a diagram of a process of text-based video object selection in accordance with one or more embodiments. As depicted in FIG. 1, a video segmentation system 100 can receive a user input 102 at numeral 1. The user input can include a text query and a video scene. For example, as used herein, the term "video scene" refers to any digital video, series of image frames, or series of illustrations. For example, the term "video scene" includes digital files with the following, or other, file extensions: .MP4, .MOV, .WMV, .FLV, .AVI, .MKV, or .SWF. The term "video scene" also includes two or more images (e.g., frames) in a digital video. Accordingly, although much of the description herein is phrased in terms of a digital video scene, it will be appreciated that the disclosure can apply to editing groups of digital images (e.g., time-lapse photography).

As used herein a "neural network" may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in the data. Additional details with respect to the use of neural networks within the video segmentation system are discussed below with respect to FIGS. 1-12.

In some embodiments, a user can provide an input video scene from an image store (e.g., on their device, such as a camera roll, file system, or application, etc., or from a storage service, such as a remote file system, cloud-based storage service, etc.) or captured by a camera. The input video may include a video scene with one or more objects that have motion during the video scene. The user may also input a text query that includes an object and an intended video edit. For example, the user may input "select the person on a motorcycle and the motorcycle and change the motorcycle from red to green" or "turn the person's shirt from green to red" or other queries. Once the user input is obtained by the video segmentation system 100, the video segmentation system can process the user input 102 using object detector 103 to extract objects from the text of the user input 102, the video of the user input 102, or both.

At numeral 2, the query parser 104 can parse the text of the user input 102. For example, the query parser 104 can include a trained machine learning model that applies natural language processing to the text of user input 102 to identify an object and an intended video edit. The object may include a person, place, or other feature of the video scene such as, but not limited to: "person with a red jacket," or "dog swimming," or "motorcyclist and the bike." The text of user input 102 may include more than one object and the query parser 104 can use the trained machine learning model to identify multiple images such as "a flock of seagulls." The text of the user input 102 may also include an intended video edit. The query parser 104 can determine a corresponding video edit command from the intended video edit. For example, the text of the user input 102 may include "change the <object parsed above> from red to green." The query parser 104 can associate this text input with a change of fill color command of a video editing application. In this example, the intended video edit is to adjust a fill color of the object from an initial color of red to an edited color of green. Returning to the example of user input 102 that is "select the person on a motorcycle and the motorcycle and change the motorcycle from red to green," the query parser 104 can output or store parameters indicating "object1=person on a motorcycle," "object2=the motorcycle," and "video edit=change fill from red to green." The query parser 104 can also filter by identifying parts of speech (e.g., noun, pronoun, adjective, etc.) for any or all of the words in input text.

At numeral 3, an image segmentation model 106 extracts multiple objects from the video of user input 102. For example, the image segmentation model 106 is an instance segmentation model that extracts objects from a frame of a video scene and labels each object individually (e.g., an image instance segmentation). The image segmentation model 106 extracts all objects from the frame of the video scene without regard to the text of the user input 102. The image segmentation model 106 includes an encoder (e.g., a cross-modal encoder) to extract features from the image through filters and a decoder that generates an output mask to include an outline of the object.

At numeral 4, the video segmentation system 100 may use an image referring model 108 to determine one or more objects within a frame of the video scene that correspond to a natural language input. The image referring model 108 may use the output of query parser 104, such as a feature vector or indicator of one or more semantic meanings of the input text. The image referring model 108 may use the semantic meanings of the input text as propositions for segmentation of each frame of the video. Continuing with the motorcycle example above, the image referring model 108 can partition the frame of the video by assigning a label to every pixel in the frame of the video such that pixels within the frame are labeled based on one or more shared characteristics. The image referring model 108 may classify one or more objects based on the labeled pixels. For instance, the image referring model 108 can identify a particular set of pixels corresponding to a "motorcycle" object and another set of pixels that correspond to a "person" object. The video segmentation system 100 can store an association between a group of objects (such as the motorcycle and the rider) such that complex video edits can be made to the group of objects. An image referring model 108 can determine any number of keyframes that include the object or group of objects. In some embodiments, the image referring model 108 may apply a filter based on an intersection-over-union (IOU) to the proposals for segmentation. An example of the image referring model 108 may include a feature pyramid network-based segmentation.

Once the video segmentation system 100 has generated the instance image segmentation and the image referring segmentation, the fusion engine 110 combines the two segmentations to produce a precise output mask at numeral 5. In some embodiments, the fusion engine 110 can generate a fusion mask by determining an output level referring segmentation mask. The fusion engine 110 can determine the output level referring segmentation mask by performing a weighted IOU with a less precise object segmentation (MDETR) that accurately corresponds to the text input and a more precise object segmentation (instance image segmentation) that accurately identifies the object. The fusion engine 110 edits the image referring segmentation to an object that matches from the instance image segmentation. For instance, the fusion engine can apply one or more transforms (e.g., moving a vertex of the image referring segmentation) to minimize a pixel difference between the image referring segmentation and the instance image segmentation. In other words, the fusion engine fuses the image referring segmentation that likely includes biasing based on text parsing with the instance image segmentation that eliminates bias. The output of the fusion engine is an improved segmentation of the object in the image to which the text input applies. In some examples, the fusion engine 110 can be described as unifying the outputs of the image segmentation model 106 and the image referring model 108. At numeral 6, the fusion engine 110 outputs one or more output masks that combine each output mask of the image segmentation model 106 and the image referring model 108 into a single output mask. It will be understood that while the fusion engine 110 is described as fusing two models, the fusion engine 110 can be configured to fuse any number of segmentation models.

Figure 2:
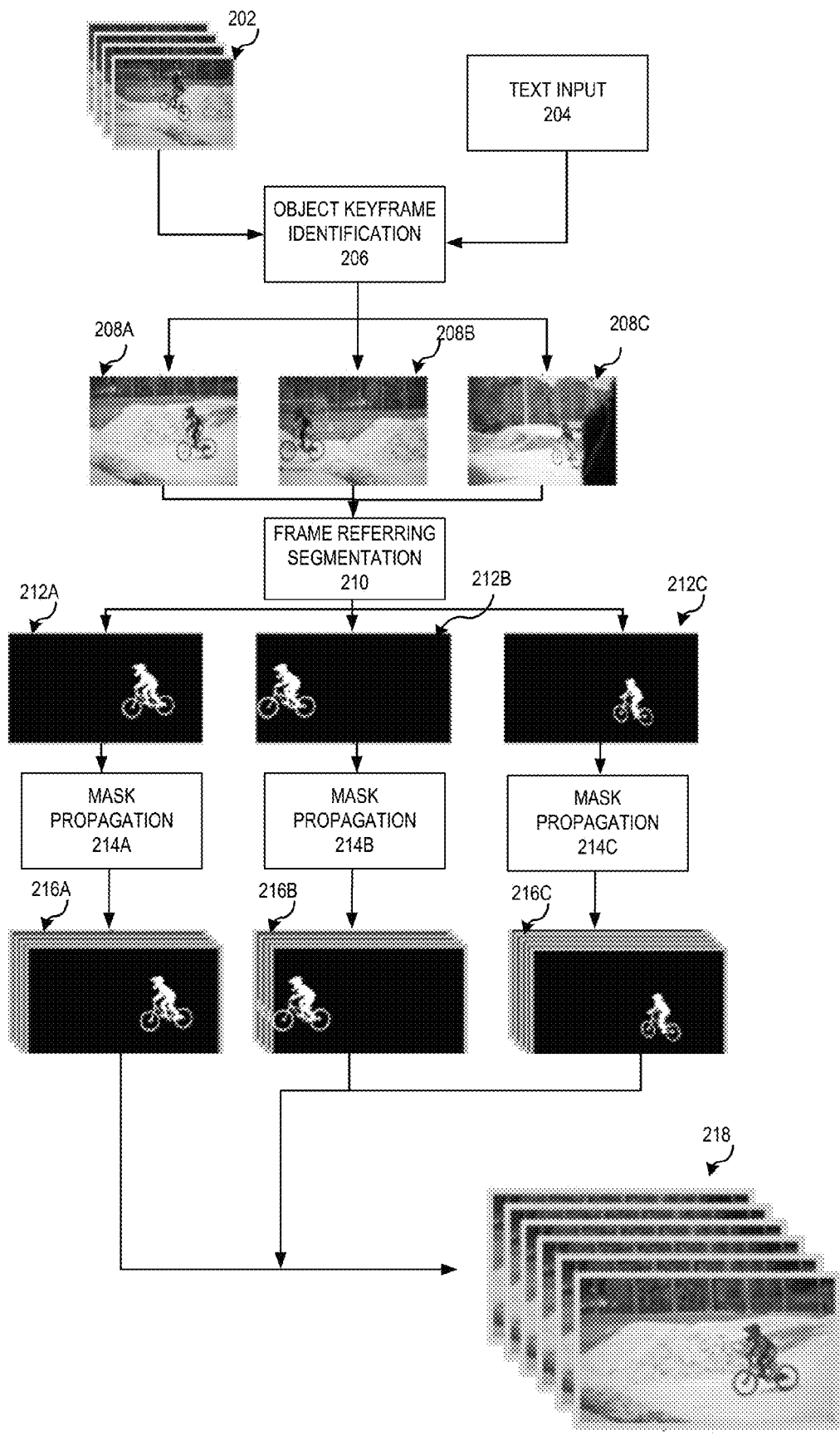
FIG. 2 illustrates a diagram of a process of generating a set of fusion masks in accordance with one or more embodiments.

FIG. 2 illustrates a diagram of a process of generating a set of reference masks in accordance with one or more embodiments. As shown in FIG. 2, a video segmentation system can receive a video that includes a set of frames 202. The video segmentation system also receives a text input 204. The video segmentation system performs object keyframe identification based on the text input 204 or the set of frames 202, such as a set of keyframes identified by the image referring model. As described above, the frames that include the object are identified by extracting an object from the text input 204, extracting objects from the set of frames 202, and matching the object from the text input 204 and the object from the set of frames 202 to produce first object keyframe 208A, second object keyframe 208B, and third object keyframe 208C, collectively "object keyframes 208A-C. The video segmentation system determines object keyframes 208A-C as a subset of the set of frames 202 that include the object. Examples of object keyframes include but are not limited to a first frame including the object, a last frame including the object, a frame in which the object changes in aspect ratio, scaling factor, warp, or a speed of motion.

Once the object keyframes are identified, the video segmentation system can generate a set of reference keyframes 212A-C (i.e., reference keyframe 212A, reference keyframe 212B, and reference keyframe 212C, collectively "reference keyframes 212A-C based on a ranking or other categorization of the keyframes based on an importance of the object keyframe. The video segmentation system propagates the reference masks using mask propagations 214A, 214B, and 214C. The mask propagations 214A, 214B, and 214C smooth the masks based on one or more common features between the reference masks 216A-C. The video segmentation system can output a set of reference frames 218 that includes the video with the reference masks 216A-C applied.

Figure 3:
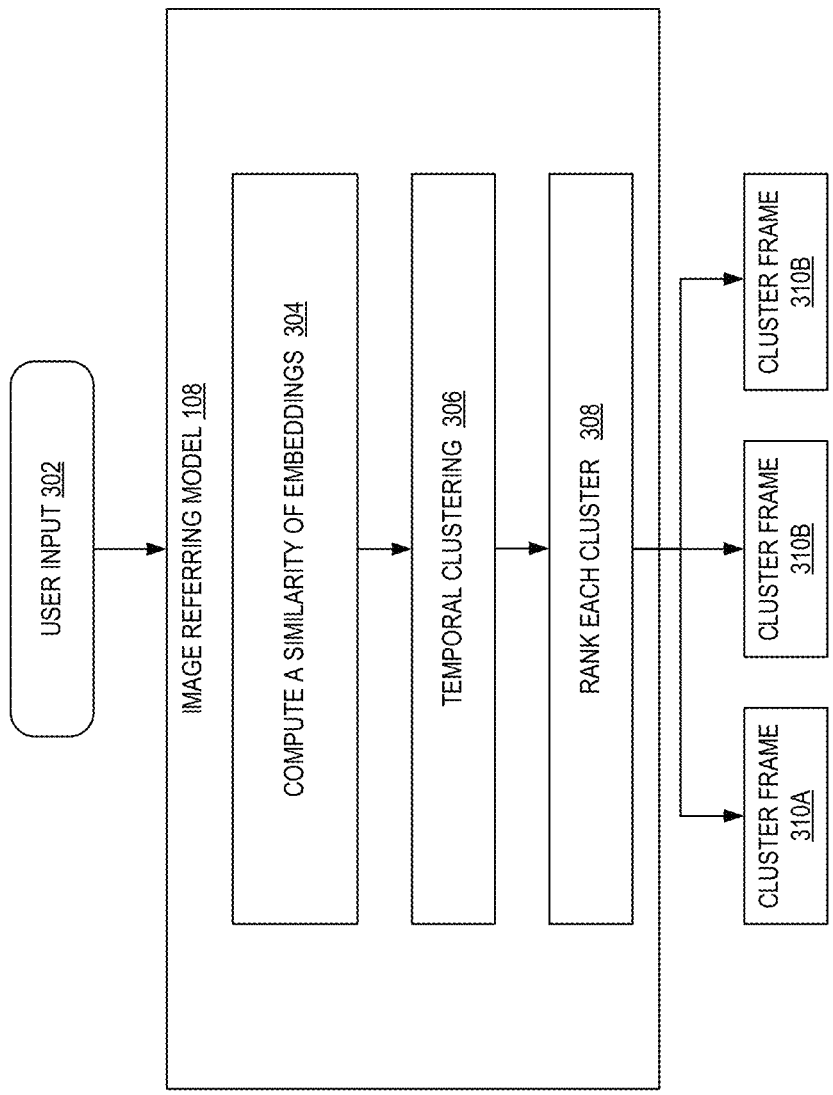
FIG. 3 illustrates an example of a process of identifying object keyframes in accordance with one or more embodiments.

FIG. 3 illustrates an example of a process of identifying object keyframes in accordance with one or more embodiments. For instance, at block 302, the image referring model can receive a user input including a set of frames of a video and an object identifier (e.g., an output of a query parser). Once the user input has been received, at block 304, the image referring model can compute a similarity of embeddings. For example, the image referring model can generate a similarity between an embedding of the set of frames and an embedding of the object identifier. In this example, the embeddings can be a feature vector that represents one or more object types in the set of frames and the object identifier. In this example, the image referring model can determine that a feature vector that represents an image of a bicycle is a match with a feature vector that represents an object identifier of a word "bicycle." The object keyframes, such as object keyframes 208A-C, may be further processed to generate a frame referring segmentation. Examples of the similarity can be a score, a likelihood, or a rank of a match between the object from the set of frames and the object from the text input.

After determining the similarity of embeddings, at block 306 the image referring model can perform temporal clustering of the frames that include the object. Continuing with the previous example, the image referring model can determine a group of frames that occur within a threshold frame proximity that to include the object. An example of the threshold frame proximity is a number of frames between the first frame including the object and the last frame including the object.

Figure 4:
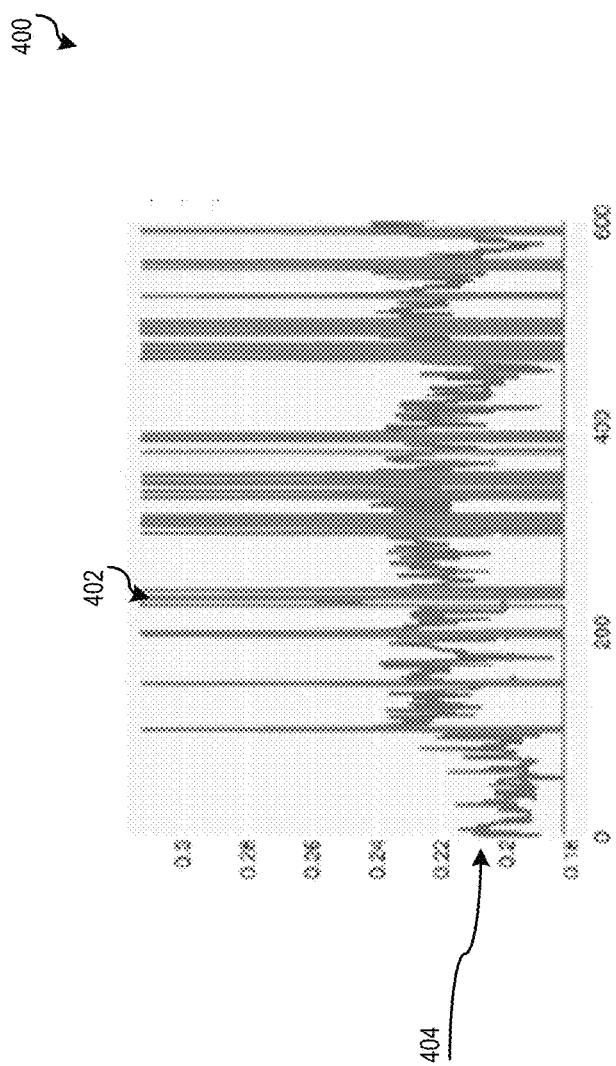
FIG. 4 illustrates an example of an object keyframe clusters in accordance with one or more embodiments.

Turning briefly to FIG. 4, an illustration of a clustering graph 400 is depicted. FIG. 4 depicts a graph of the object being present in a frame during the video scene. The example of FIG. 4 depicts a cluster 402 and a similarity score 404. An example of a cluster 402 may include a number of frames that include the object and are within a proximity of other frames that also include the object. The similarity score 404 may be computed as a similarity between a current frame to one or more of previous frames. An example of the similarity score may be computed on a pixelwise difference that measures common characteristics such as hue, brightness, curves, and the like.

Returning to FIG. 3 at block 308, the image referring model can rank the clusters based on their size which indicates a consecutive number of frames that include the image. The image referring model can determine a set of clusters (e.g., top 3, top 5, above a threshold size, etc.) to output one or more keyframes. In this example, the image referring model has output cluster frames 310A-C that indicate a respective keyframe for cluster A, cluster B, and cluster C (not shown, but cluster 402 is an example of one cluster).

Figure 5:
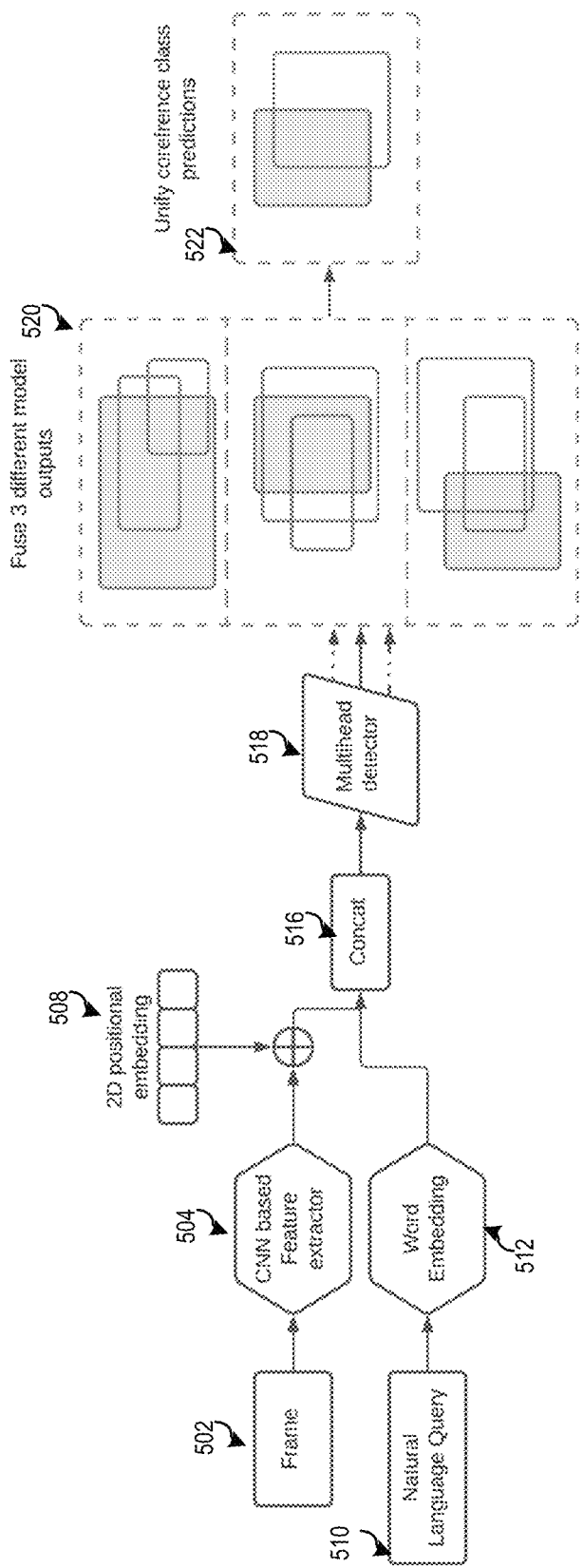
FIG. 5 illustrates an example of a model architecture of unifying co-reference class predictions in accordance with one or more embodiments.

FIG. 5 illustrates an example of a model architecture 500 of unifying co-reference class predictions in accordance with one or more embodiments. The video segmentation system can generate a unified co-reference class prediction to fuse model outputs and generate precision output masks. Similar to the description of the video segmentation system with regard to FIGS. 1-4, a frame 502 and a natural language query 510 can be received in a user input. The video segmentation system can process the frame using a convolutional neural network based feature extractor 504. The output of the feature extractor 504 can be a vector that is added to two-dimensional (2-D) positional embeddings 508. The 2-D positional embeddings may represent each input text with a position in a 2-D embedding space. The 2-D positional embeddings 508 can be relative position or fixed position. The 2-D positional embeddings can be combined with the output of the feature extractor 504.

The video segmentation system processes the natural language query 510 to generate a word embedding 512 using a machine learning model such as a ROBERTa model (e.g., by query parser 104). The word embedding 512 and the combination of the 2-D positional embeddings 508 can be further combined with the output of the feature extractor 504 as described below.

The video segmentation system can perform a concatenation 516 of the word embedding 512 and the combination of the 2-D positional embeddings 508 and the output of feature extractor 504. The concatenation 516 combines a text feature and 2-D positional embeddings to input into a trained machine learning model that is trained to label objects in a video frame with a similar embedding to an embedding of the text feature. The video segmentation system can apply a multihead detector 518 (e.g., the image referring model 108) to the output of the concatenation operation. In some embodiments, the multihead detector 518 is a multihead machine learning model that generates a multihead dataset (e.g., a single head corresponds to a single feature). In some embodiments, each head may represent a segmentation including an object that may correspond to the meaning of the natural language query. As described above, multiple objects may be identified for each natural language query.

The video segmentation system (e.g., the fusion engine) can perform a fusion 520 of the outputs of the multihead detector 518. For example, the video segmentation system can combine multiple segmentations to produce an output mask. The video segmentation system fuses the multiple segmentations by performing a weighted IOU to form a consensus segmentation by applying one or more transformations to the different segmentations until a threshold difference between the segmentations is achieved. The video segmentation system performs a unification 522 of the multiple segmentations by modifying each to converge on a more accurate identification of the object in the frame. The unification 522 can include the image referring segmentation and an instance image segmentation that are fused to generate the output mask.

Figure 6:
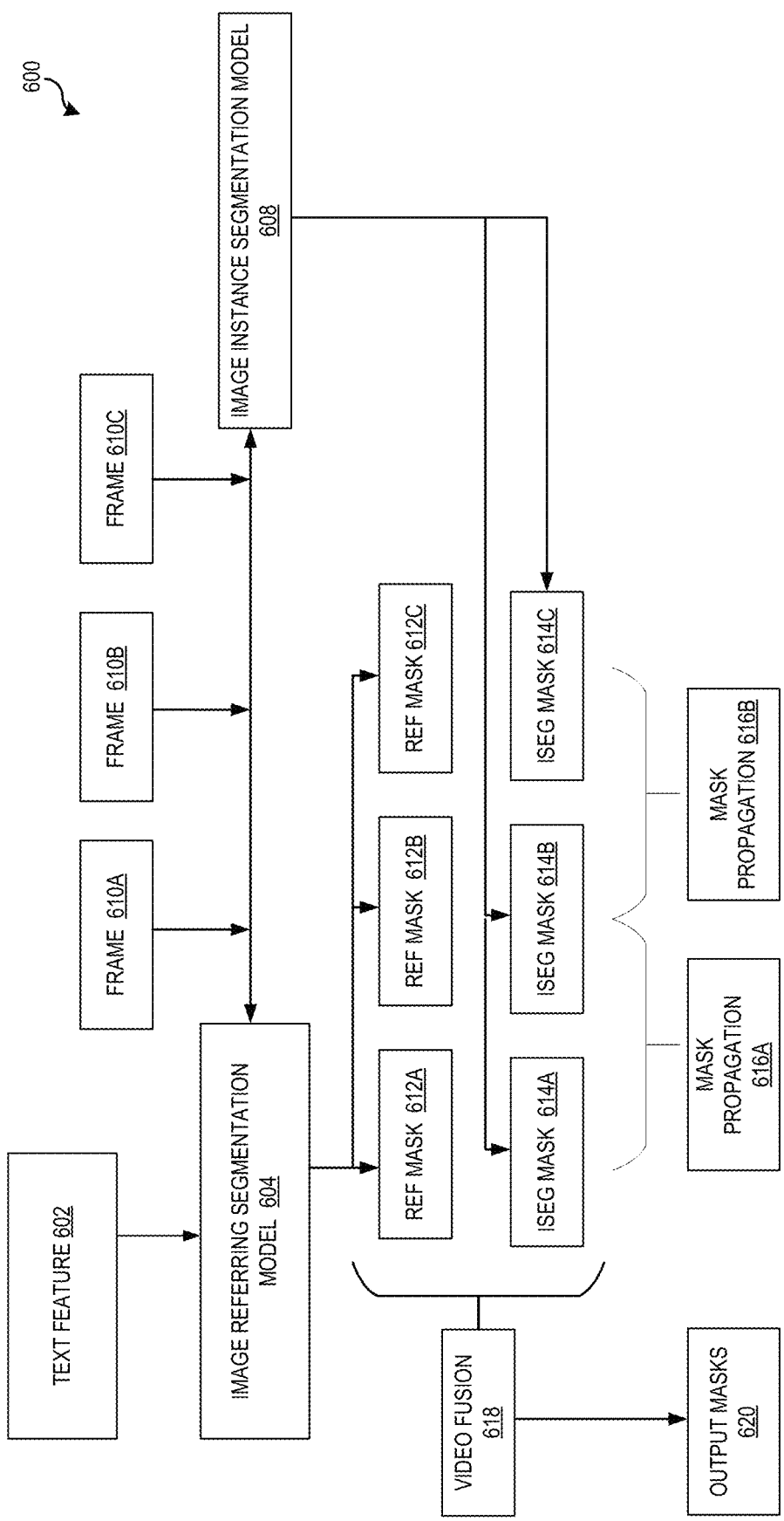
FIG. 6 illustrates an example of a process of text-based video object selection by generating a set of fusion masks in accordance with one or more embodiments.

FIG. 6 illustrates an example of a process of text-based video object selection by generating a set of fusion masks in accordance with one or more embodiments. The video segmentation system can receive a text feature 602 and a set of still frames 610 (i.e., frame 610A, frame 610B, and frame 610C, collectively "still frames 610").

The video segmentation system can include an image instance segmentation model 608 (e.g., image segmentation model 106 of FIG. 1) that extracts multiple objects from the still frames 610. For example, the instance image segmentation model 608 extracts various objects and classifies each object with a respective label. The instance image segmentation model 608 extracts all objects from the frame of the video scene using an encoder to extract features from the image and a decoder to produce an output mask that includes a shape of the object (e.g., an outline, a solid fill shape, etc.). The image instance segmentation model 608 outputs segmentation masks 614 (i.e., iseg mask 614A, iseg mask 614B, and iseg mask 614C, collectively "segmentation masks 614").

The video segmentation system can include an image referring segmentation model 604 to identify an object in the still frames 610 that corresponds to a natural language input. The image referring segmentation model 604 may proposition one or more semantic meanings of the natural language input for segmentation of still frames 610 such as by localizing the plurality of image features using the object vocabulary. The image referring segmentation model 604 may classify an object based on pixels that to include an image associated with the one or more semantic meanings. The image referring segmentation model 604 outputs a set of reference masks 612 (i.e., ref mask 612A, ref mask 612B, and ref mask 612C, collectively "reference masks 612"). The video segmentation system propagates the reference masks using mask propagations 616A and 616B. The mask propagations 616A and 616B smooth the masks based on one or more common features between the reference masks 614A-C.

The video segmentation system can perform video fusion 618 by combining the two segmentations to produce a precise output mask. The video segmentation system computes the output segmentation mask by performing edits to the reference mask and the segmentation masks. For instance, the video segmentation system can adjust one or more points of the image referring mask to achieve a threshold difference between the image referring segmentation and the instance image segmentation. The output of the fusion is an improved segmentation of the object in the image to which the text input applies and eliminates or reduces bias of the mask caused by the text parser. The video segmentation system outputs a set of output masks 620 based on the fusion of the reference mask and the segmentation masks.

Figure 7:
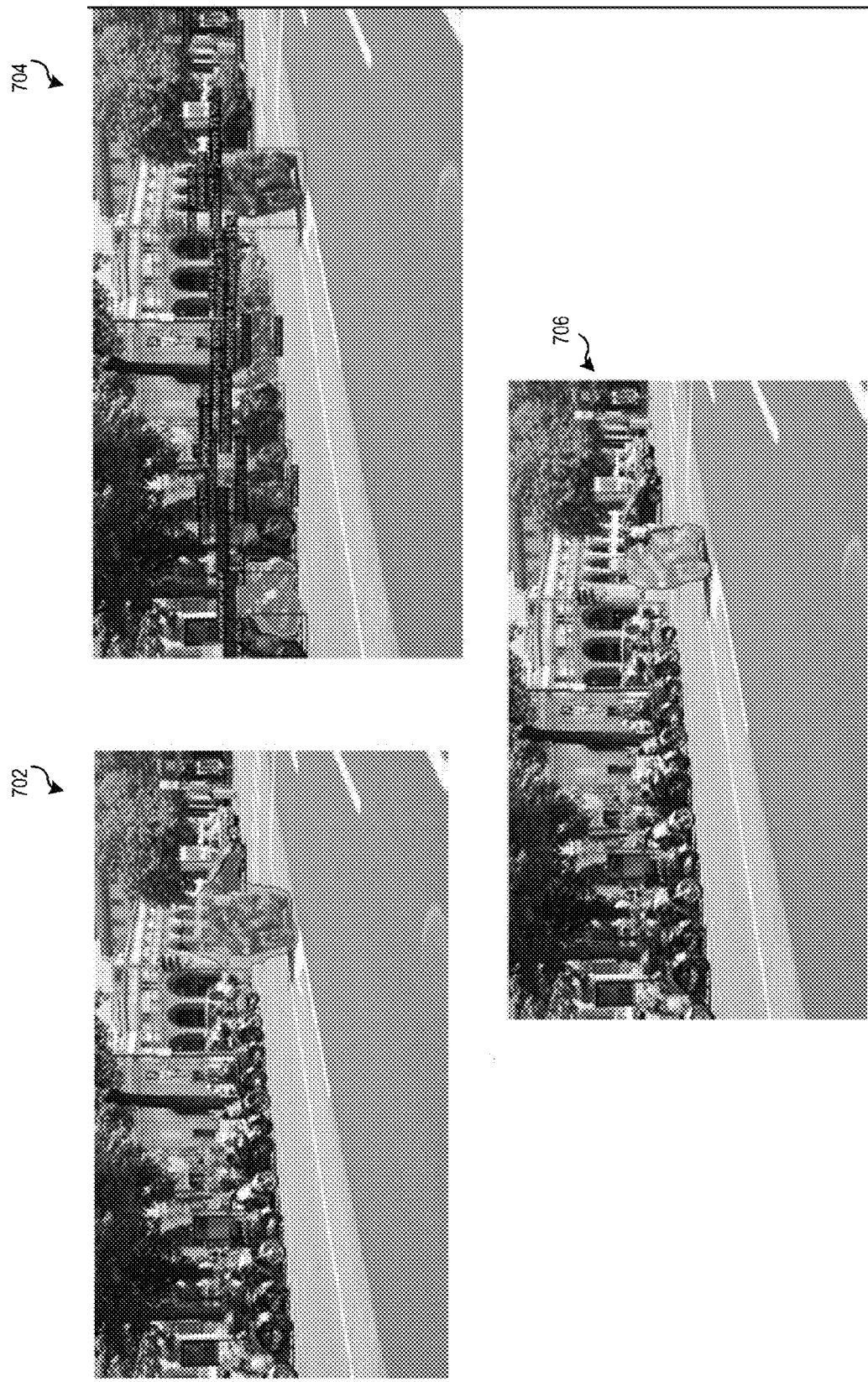
FIG. 7 illustrates an example of a results comparison of text-based video object selection in accordance with one or more embodiments.

FIG. 7 illustrates an example of a results comparison of text-based video object selection in accordance with one or more embodiments. As depicted in FIG. 7, outputs of various approaches to video segmentation are presented. A masked output 702 from an end-to-end modulated detector (MDETR) segments the object of a motorcycle and rider, but as depicted in FIG. 7, there are regions that deviate laterally from a precise boundary of the object. These regions of deviation can degrade the output when a mask is applied to the video scene. Another masked output 704 identifies multiple objects that match motorcycle and also identify the person object. A fused output 706 results from the fusion between reference masks and image segmentation masks to generate a precision mask of the motorcycle and rider. As clearly shown in FIG. 7, the fused output produces a substantial improvement to masked outputs 702 and 704.

Figure 8:
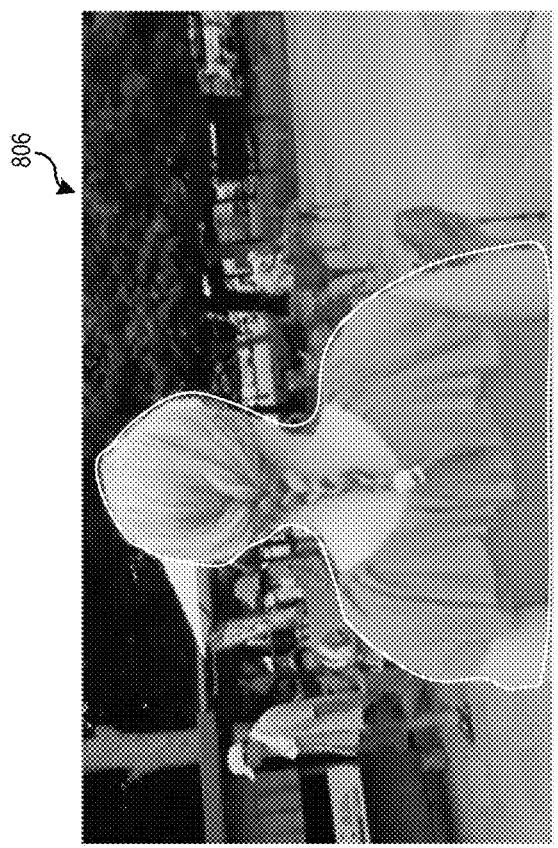
FIG. 8 illustrates another example of a results comparison of text-based video object selection in accordance with one or more embodiments.
Figure 8:
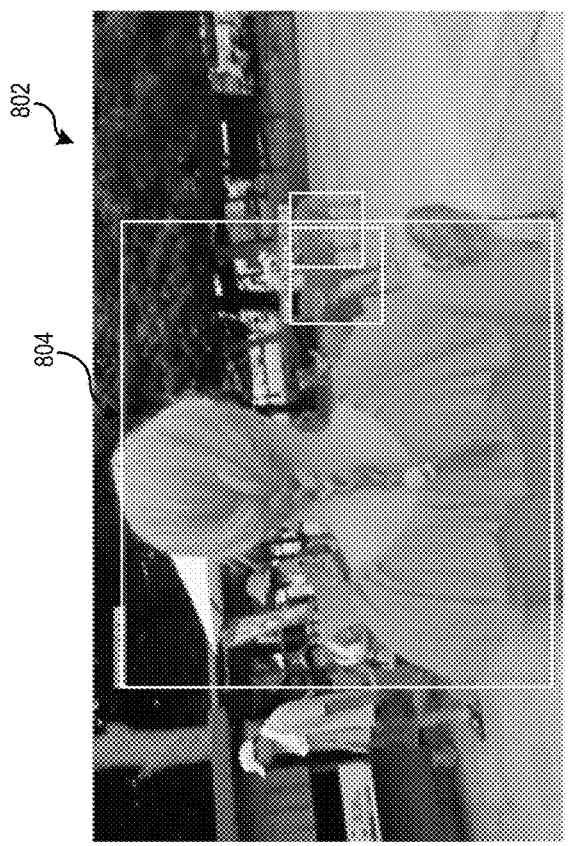

FIG. 8 illustrates another example of a results comparison of text-based video object selection in accordance with one or more embodiments. FIG. 8 depicts segmented video scene 802 that identifies a person and two animals in the video scene. The bounding box 804 for the person is not fully captured because the top of the head of the person is not included in the bounding box 804. There is a portion of the person object that is not included within the bounding box that may result in an undesirable output masked video scene. The bounding box 804 additionally captures two other objects of type "cow" that are undesirable to include in an output mask. By performing a fusion, these bounding box inaccuracies can be removed so that only the precisely segmented object is captured by a bounding shape. The fused output scene 806 depicts a precise object identification of the person. The fused output scene 806 is generated using the systems and methods as described herein.

Figure 9:
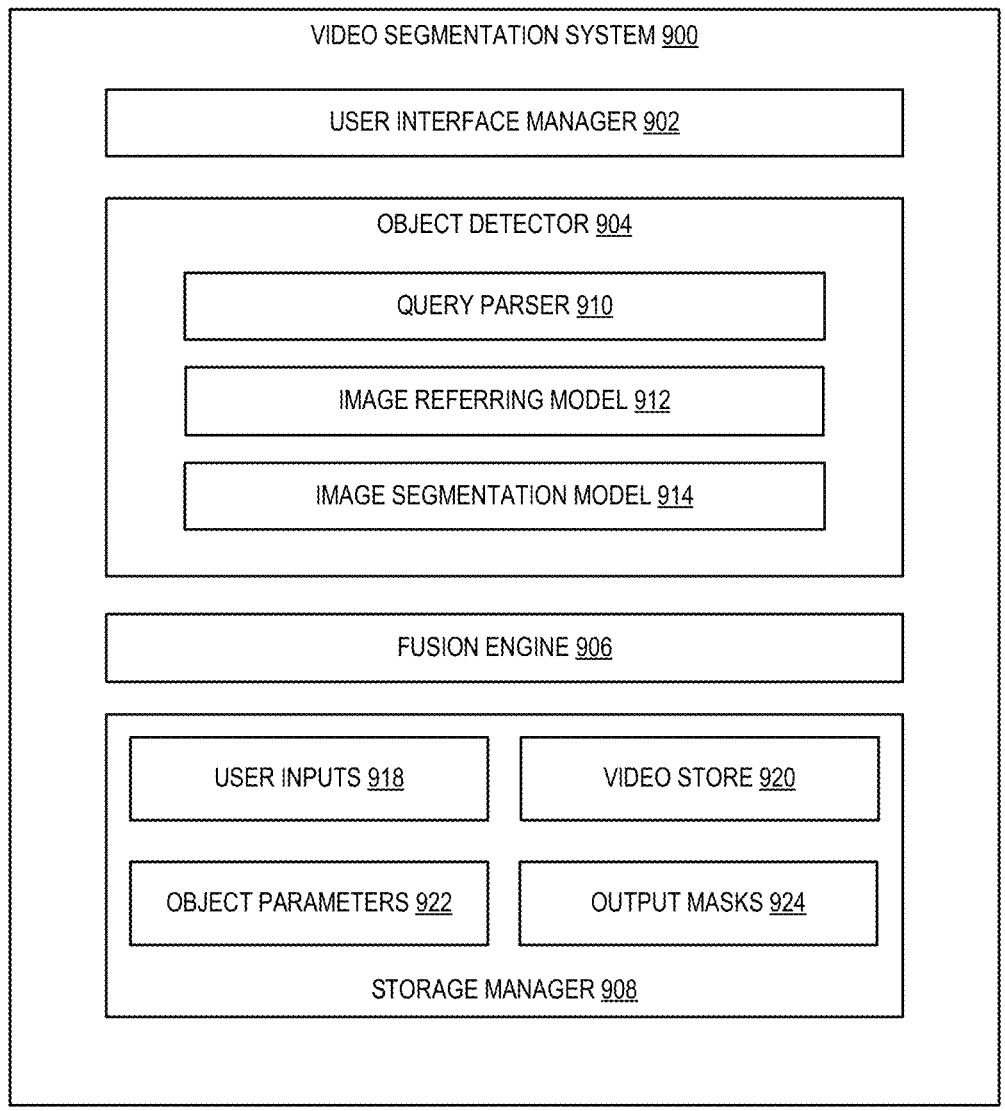
FIG. 9 illustrates a schematic diagram of video segmentation system in accordance with one or more embodiments.

FIG. 9 illustrates a schematic diagram of video segmentation system 900 in accordance with one or more embodiments. As shown, video segmentation system 900 may include, but is not limited to, a user interface manager 902, an object detector 904, fusion engine 906, and storage manager 908. The object detector 904 includes a query parser 910, an image referring model 912, and an image segmentation model 914. The query parser 910 may be a trained machine learning model that extracts one or more text features from the input from the user received by user interface manager 902. The image referring model 912 may use the output of the query parser 910 to generate propositions for segmentation of each frame of the video. The image referring model 912 may classify one or more objects based on a set of pixels that are labeled based on a semantic meaning of the proposition and multiple objects in the frame of the video. The image segmentation model 914 extracts objects from a frame of the video input. For example, the image segmentation model 914 is an instance segmentation model that extracts objects from a frame of a video scene and labels each object individually. The image segmentation model 914 extracts all objects from the frame of the video scene. The image segmentation model 914 includes an encoder to extract features from the image through filters and a decoder that generates an output mask including an outline of the object.

As illustrated in FIG. 9, the video segmentation system 900 includes a fusion engine 906. The fusion engine 906 can combine multiple segmentations of frames of a video input into a fusion model. For example, as discussed, the fusion engine 906 can generate a fusion mask by determining an output segmentation mask. The fusion engine 906 can determine the output segmentation mask by performing a weighted IOU that generates an output mask that accurately identifies the object corresponding to the text input. The fusion engine 906 can be described as unifying the outputs of an image segmentation model 914 and an image referring model 912.

As illustrated in FIG. 9, the video segmentation system 900 also includes the storage manager 908. The storage manager 908 maintains data for the video segmentation system 900. The storage manager 908 can maintain data of any type, size, or kind as necessary to perform the functions of the video segmentation system 900. The storage manager 908, as shown in FIG. 9, includes the user inputs 918. The user inputs 918 can include a plurality of video scenes, text inputs, and the like, as discussed in additional detail above. In particular, in one or more embodiments, the user inputs 918 include text inputs and video scenes that may be utilized by the image referring model 912, image segmentation model 914, or fusion engine 906 to train one or more machine learning models to improve object segmentation providing additional training data for any of the machine learning models based on specific users, video scenes, or other factors described herein.

As further illustrated in FIG. 9, the storage manager 908 also includes video store 920. Video store 920 can include video scenes other than video scenes provided in the user inputs 918. For example, video store 920 includes a digital archive of video scenes that can be selectable by the user to process a video edit (e.g., stock video reel, a video received from another user, etc.).

The storage manager 908 may also include object parameters 922. The object parameters 922 may include a definition (e.g., a vector representation) of a set of object types. The object parameters 922 may include public object definitions, such as the ImageNet dataset, and/or private object definition data generated and maintained by a particular user or group of users, private company, or other entity.

The storage manager 908 may also include output masks 924 that are output from the fusion engine 906. The output masks 924 may be stored in groups based on a video to which the output masks 924 are associated.

Each of the components 902-908 of the video segmentation system 900 and their corresponding elements (as shown in FIG. 9) may be in communication with one another using any suitable communication technologies. It will be recognized that although components 902-908 and their corresponding elements are shown to be separate in FIG. 9, any of components 902-908 and their corresponding elements may be combined into fewer components, such as into a single facility or module, divided into more components, or configured into different components as may serve a particular embodiment.

The components 902-908 and their corresponding elements can comprise software, hardware, or both. For example, the components 902-908 and their corresponding elements can comprise one or more instructions stored on a computer-readable storage medium and executable by processors of one or more computing devices. When executed by the one or more processors, the computer-executable instructions of the video segmentation system 900 can cause a client device and/or a server device to perform the methods described herein. Alternatively, the components 902-908 and their corresponding elements can comprise hardware, such as a special purpose processing device to perform a certain function or group of functions. Additionally, the components 902-908 and their corresponding elements can comprise a combination of computer-executable instructions and hardware.

Furthermore, the components 902-908 of the video segmentation system 900 may, for example, be implemented as one or more stand-alone applications, as one or more modules of an application, as one or more plug-ins, as one or more library functions or functions that may be called by other applications, and/or as a cloud-computing model. Thus, the components 902-908 of the video segmentation system 900 may be implemented as a stand-alone application, such as a desktop or mobile application. Furthermore, the components 902-908 of the video segmentation system 900 may be implemented as one or more web-based applications hosted on a remote server. Alternatively, or additionally, the components of the video segmentation system 900 may be implemented in a suit of mobile device applications or "apps." To illustrate, the components of the video segmentation system 900 may be implemented as part of an application, or suite of applications, including but not limited to ADOBE CREATIVE CLOUD, ADOBE PHOTO SHOP, ADOBE ACROBAT, ADOBE ILLUSTRATOR, ADOBE LIGHTROOM and ADOBE INDESIGN. "ADOBE", "CREATIVE CLOUD," "PHOTO SHOP," "ACROBAT," "ILLUSTRATOR," "LIGHTROOM," and "INDESIGN" are either registered trademarks or trademarks of Adobe Inc. in the United States and/or other countries.

Figure 10:
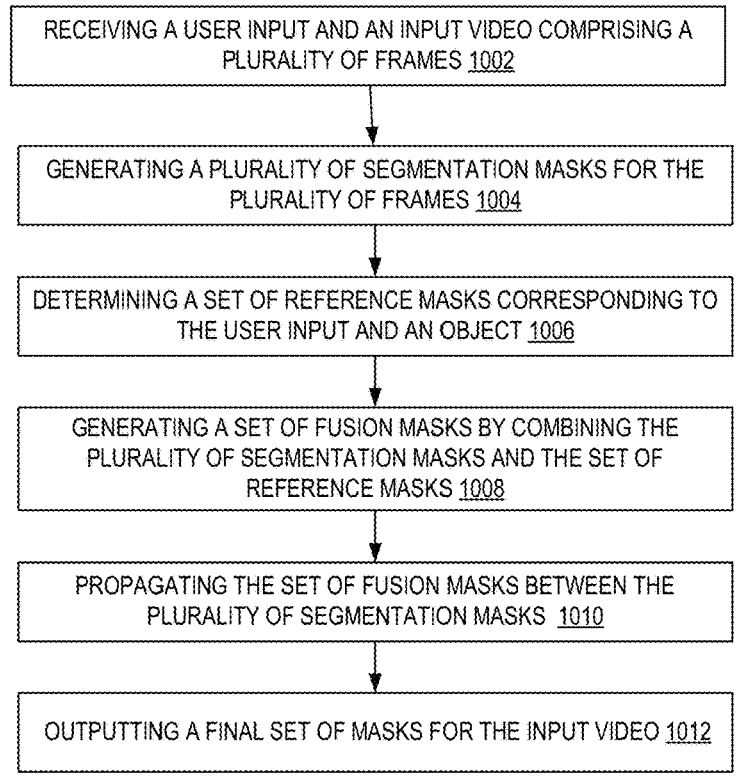
FIG. 10 illustrates a flowchart of a series of acts in a method of text-based video object selection in accordance with one or more embodiments.

FIGS. 1-9, the corresponding text, and the examples, provide a number of different systems and devices that allows a user to perform text-based video object selection. In addition to the foregoing, embodiments can also be described in terms of flowcharts comprising acts and steps in a method for accomplishing a particular result. For example, FIG. 10 illustrates a flowchart of an exemplary method in accordance with one or more embodiments. The method described in relation to FIG. 10 may be performed with fewer or more steps/acts or the steps/acts may be performed in differing orders. Additionally, the steps/acts described herein may be repeated or performed in parallel with one another or in parallel with different instances of the same or similar steps/acts.

FIG. 10 illustrates a flowchart 1000 of a series of acts in a method of text-based video object segmentation in accordance with one or more embodiments. In one or more embodiments, the method 1000 is performed in a digital medium environment that includes the video segmentation system 900. The method 1000 is intended to be illustrative of one or more methods in accordance with the present disclosure and is not intended to limit potential embodiments. Alternative embodiments can include additional, fewer, or different steps than those articulated in FIG. 10.

As illustrated in FIG. 10, the method 1000 includes an act 1002 of receiving a user input and an input video comprising a plurality of frames. The input video may include a video scene with a plurality of frames to include at least one object. The video segmentation system receives a text query that includes an object and an intended video edit.

In some embodiments, the method 1000 can include an act of extracting, using a first machine learning model, a text feature from the user input, wherein the text feature corresponds to an object. The video segmentation system can analyze the semantic meanings of the user input. The video segmentation system can include a trained machine learning model that applies natural language processing to the text to identify a text feature. The text feature corresponds to an object and an intended video edit. The object may include a person, place, or other feature of the video scene. The video segmentation system can further analyze the text for an intended video edit. The video segmentation system can determine a corresponding video edit command from the intended video edit.

In some embodiments, the method 1000 can include an act of extracting, using a second machine learning model, a plurality of image features from the plurality of frames, wherein a selected image feature corresponds to the object. The video segmentation system extracts all objects from the frame of the video scene. The video segmentation system includes an encoder to extract features from the image through filters and a decoder that generates an output mask to include an outline of the object.

In some embodiments, the method 1000 can include an act of identifying one or more keyframes from the plurality of frames that to include the object. As described above, some of the frames that include the object are identified as object keyframes as a subset of the set of frames of the video that to include the object. The video segmentation system can identify a keyframe as a first frame to include the object, a last frame to include the object, a frame in which the object changes in aspect ratio, scaling factor, warp, or a speed of motion.

In some embodiments, the method 1000 can include an act of clustering one or more groups of the one or more keyframes that are within a threshold proximity to each other. The video segmentation system can determine a group of frames that occur within a threshold frame proximity and that to include the object. The video segmentation system can determine that an object is present in a set of frames including a number of frames between the first frame including the object and the last frame including the object.

As illustrated in FIG. 10, the method 1000 includes an act 1004 of generating a plurality of segmentation masks for the plurality of frames. The video segmentation system can extract multiple objects from the still. The video segmentation system extracts all objects from the frame of the video scene to produce an output mask that to include a shape of the object. The image instance segmentation model outputs segmentation masks 614.

As illustrated in FIG. 10, the method 1000 includes an act 1006 of determining a set of reference masks corresponding to the user input and an object. The video segmentation system identifies an object in the frames of the video that corresponds to a natural language input. The video segmentation system may proposition one or more semantic meanings of the natural language input for segmentation. The video segmentation system may classify an object based on pixels that to include an image associated with the one or more semantic meanings.

As illustrated in FIG. 10, the method 1000 includes an act 1008 of generating a set of fusion masks by combining the plurality of segmentation masks and the set of reference masks. The video segmentation system combines multiple segmentations to produce an output mask. The video segmentation system computes the output segmentation mask by performing edits to the each of the segmentations. The video segmentation system outputs a set of output masks based on the fusion of the multiple segmentations.

As illustrated in FIG. 10, the method 1000 includes an act 1010 of propagating the set of fusion masks between the plurality of segmentation masks. The video segmentation system propagates the reference masks to smooth the masks based on one or more common features between the reference masks.

As illustrated in FIG. 10, the method 1000 includes an act 1012 of outputting a final set of masks for the input video. The video segmentation system outputs a segmentation mask for each frame of the video by performing edits to the reference mask and the segmentation masks.

Figure 11:
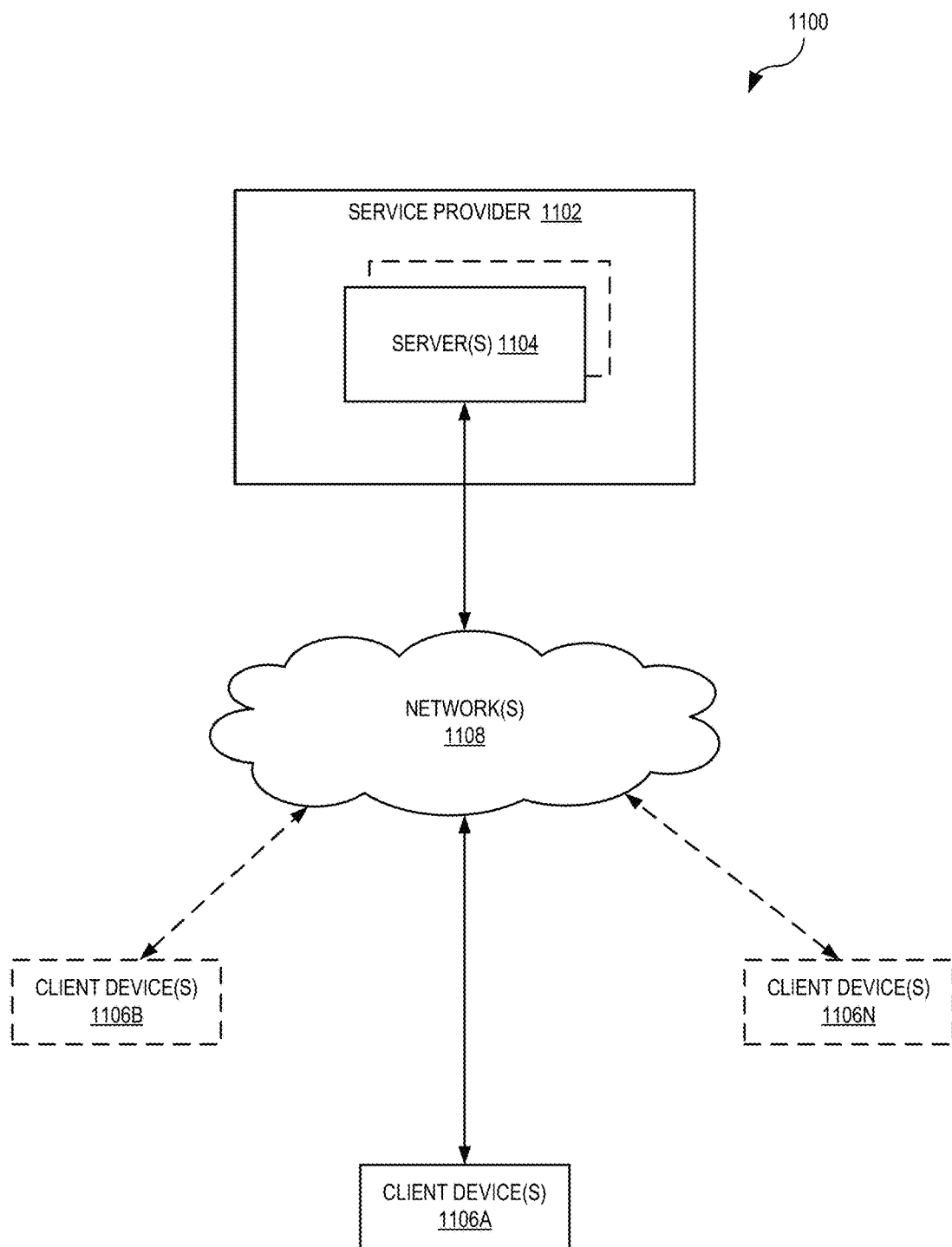
FIG. 11 illustrates a schematic diagram of an exemplary environment in which the image processing system can operate in accordance with one or more embodiments.

FIG. 11 illustrates a schematic diagram of an exemplary environment 1100 in which the video segmentation system 900 can operate in accordance with one or more embodiments. In one or more embodiments, the environment 1100 includes a service provider 1102 which may include one or more servers 1104 connected to a plurality of client devices 1106A-1106N via one or more networks 1108. The client devices 1106A-1106N, the one or more networks 1108, the service provider 1102, and the one or more servers 1104 may communicate with each other or other components using any communication platforms and technologies suitable for transporting data and/or communication signals, including any known communication technologies, devices, media, and protocols supportive of remote data communications, examples of which will be described in more detail below with respect to FIG. 12.

Although FIG. 11 illustrates a particular arrangement of the client devices 1106A-1106N, the one or more networks 1108, the service provider 1102, and the one or more servers 1104, various additional arrangements are possible. For example, the client devices 1106A-1106N may directly communicate with the one or more servers 1104, bypassing the network 1108. Or alternatively, the client devices 1106A-1106N may directly communicate with each other. The service provider 1102 may be a public cloud service provider which owns and operates their own infrastructure in one or more data centers and provides this infrastructure to customers and end users on demand to host applications on the one or more servers 1104. The servers may include one or more hardware servers (e.g., hosts), each with its own computing resources (e.g., processors, memory, disk space, networking bandwidth, etc.) which may be securely divided between multiple customers, each of which may host their own applications on the one or more servers 1104. In some embodiments, the service provider may be a private cloud provider which maintains cloud infrastructure for a single organization. The one or more servers 1104 may similarly include one or more hardware servers, each with its own computing resources, which are divided among applications hosted by the one or more servers for use by members of the organization or their customers.

Similarly, although the environment 1100 of FIG. 11 is depicted as having various components, the environment 1100 may have additional or alternative components. For example, the environment 1100 can be implemented on a single computing device with the video segmentation system 900. In particular, the video segmentation system 900 may be implemented in whole or in part on the client device 1102A.

As illustrated in FIG. 11, the environment 1100 may include client devices 1106A-1106N. The client devices 1106A-1106N may comprise any computing device. For example, client devices 1106A-1106N may comprise one or more personal computers, laptop computers, mobile devices, mobile phones, tablets, special purpose computers, TVs, or other computing devices, including computing devices described below with regard to FIG. 12. Although three client devices are shown in FIG. 11, it will be appreciated that client devices 1106A-1106N may comprise any number of client devices (greater or smaller than shown).

Moreover, as illustrated in FIG. 11, the client devices 1106A-1106N and the one or more servers 1104 may communicate via one or more networks 1108. The one or more networks 1108 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 1108 may be any suitable network over which the client devices 1106A-1106N may access service provider 1102 and server 1104, or vice versa. The one or more networks 1108 will be discussed in more detail below with regard to FIG. 12.

In addition, the environment 1100 may also include one or more servers 1104. The one or more servers 1104 may generate, store, receive, and transmit any type of data, including user inputs 918, video store 920, object parameters 922, or other information. For example, a server 1104 may receive data from a client device, such as the client device 1106A, and send the data to another client device, such as the client device 1102B and/or 1102N. The server 1104 can also transmit electronic messages between one or more users of the environment 1100. In one example embodiment, the server 1104 is a data server. The server 1104 can also comprise a communication server or a web-hosting server. Additional details regarding the server 1104 will be discussed below with respect to FIG. 12.

As mentioned, in one or more embodiments, the one or more servers 1104 can include or implement at least a portion of the video segmentation system 900. In particular, the video segmentation system 900 can comprise an application running on the one or more servers 1104 or a portion of the video segmentation system 900 can be downloaded from the one or more servers 1104. For example, the video segmentation system 900 can include a web hosting application that allows the client devices 1106A-1106N to interact with content hosted at the one or more servers 1104. To illustrate, in one or more embodiments of the environment 1100, one or more client devices 1106A-1106N can access a webpage supported by the one or more servers 1104. In particular, the client device 1106A can run a web application (e.g., a web browser) to allow a user to access, view, and/or interact with a webpage or website hosted at the one or more servers 1104.

Upon the client device 1106A accessing a webpage or other web application hosted at the one or more servers 1104, in one or more embodiments, the one or more servers 1104 can provide access to one or more digital images (e.g., the input image data 912, such as camera roll or an individual's personal photos) stored at the one or more servers 1104. Moreover, the client device 1106A can receive a request (i.e., via user input) to segment a video based on an input text string and provide the request to the one or more servers 1104. Upon receiving the request, the one or more servers 1104 can automatically perform the methods and processes described above to generate a set of fusion masks. The one or more servers 1104 can provide all or portions of one or more output masks and the video, to the client device 1106A for display to the user.

As just described, the video segmentation system 900 may be implemented in whole, or in part, by the individual elements 1102-1108 of the environment 1100. It will be appreciated that although certain components of the video segmentation system 900 are described in the previous examples with regard to particular elements of the environment 1100, various alternative implementations are possible. For instance, in one or more embodiments, the video segmentation system 900 is implemented on any of the client devices 1106A-N. Similarly, in one or more embodiments, the video segmentation system 900 may be implemented on the one or more servers 1104. Moreover, different components and functions of the video segmentation system 900 may be implemented separately among client devices 1106A-1106N, the one or more servers 1104, and the network 1108.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
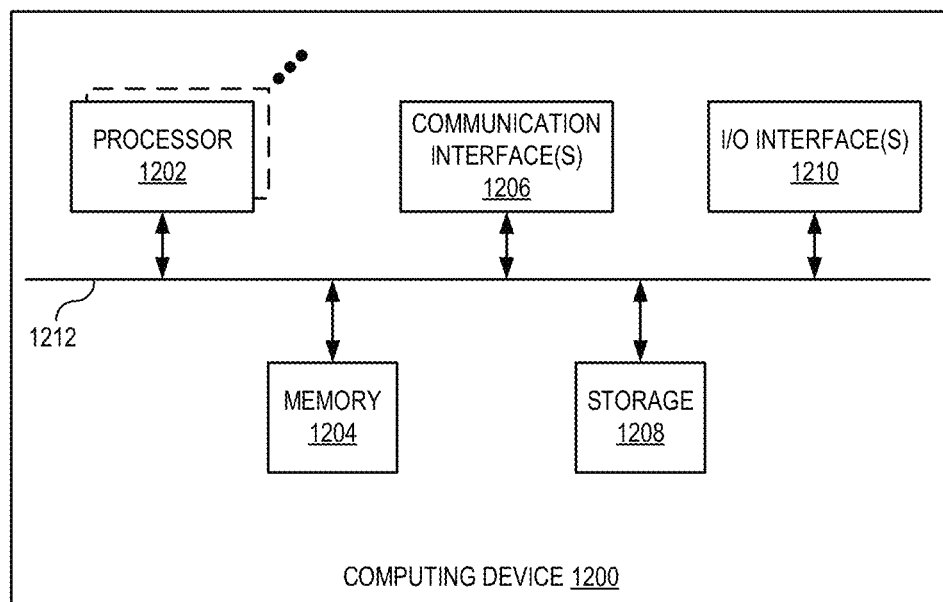
FIG. 12 illustrates a block diagram of an exemplary computing device in accordance with one or more embodiments.

FIG. 12 illustrates, in block diagram form, an exemplary computing device 1200 that may be configured to perform one or more of the processes described above. One will appreciate that one or more computing devices such as the computing device 1200 may implement the image processing system. As shown by FIG. 12, the computing device can comprise a processor 1202, memory 1204, one or more communication interfaces 1206, a storage device 1208, and one or more I/O devices/interfaces 1210. In certain embodiments, the computing device 1200 can include fewer or more components than those shown in FIG. 12. Components of computing device 1200 shown in FIG. 12 will now be described in additional detail.

In particular embodiments, processor(s) 1202 includes hardware for executing instructions, such as those making up a computer program. As an example, and not by way of limitation, to execute instructions, processor(s) 1202 may retrieve (or fetch) the instructions from an internal register, an internal cache, memory 1204, or a storage device 1208 and decode and execute them. In various embodiments, the processor(s) 1202 may include one or more central processing units (CPUs), graphics processing units (GPUs), field programmable gate arrays (FPGAs), systems on chip (SoC), or other processor(s) or combinations of processors.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1204 may be internal or distributed memory.

The computing device 1200 can further include one or more communication interfaces 1206. A communication interface 1206 can include hardware, software, or both. The communication interface 1206 can provide one or more interfaces for communication (such as, for example, packet-based communication) between the computing device and one or more other computing devices 1200 or one or more networks. As an example, and not by way of limitation, communication interface 1206 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can comprise hardware, software, or both that couples components of computing device 1200 to each other.

The computing device 1200 includes a storage device 1208 includes storage for storing data or instructions. As an example, and not by way of limitation, storage device 1208 can comprise a non-transitory storage medium described above. The storage device 1208 may include a hard disk drive (HDD), flash memory, a Universal Serial Bus (USB) drive or a combination of these or other storage devices. The computing device 1200 also includes one or more input or output ("I/O") devices/interfaces 1210, which are provided to allow a user to provide input to (such as user strokes), receive output from, and otherwise transfer data to and from the computing device 1200. These I/O devices/interfaces 1210 may include a mouse, keypad or a keyboard, a touch screen, camera, optical scanner, network interface, modem, other known I/O devices or a combination of such I/O devices/interfaces 1210. The touch screen may be activated with a stylus or a finger.

The I/O devices/interfaces 1210 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1210 is configured to provide graphical data to a display for presentation to a user. The graphical data may be representative of one or more graphical user interfaces and/or any other graphical content that may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A computer-implemented method comprising:
   receiving a user input and an input video comprising a plurality of frames;
   generating a plurality of segmentation masks for the plurality of frames;
   determining a set of reference masks corresponding to the user input and an object;
   generating a set of fusion masks by combining the plurality of segmentation masks and the set of reference masks;
   propagating the set of fusion masks between the plurality of segmentation masks; and
   outputting a final set of masks for the input video.

2. The method of claim 1, wherein determining the set of reference masks corresponding to the user input and an object further comprises:
   extracting, using a first machine learning model, a text feature from the user input, wherein the text feature corresponds to the object;
   extracting, using a second machine learning model, a plurality of image features from the plurality of frames, wherein a selected image feature corresponds to the object;
   identifying one or more keyframes from the plurality of frames that include the object; and
   clustering one or more groups of the one or more keyframes that are within a threshold proximity to each other.

3. The method of claim 2, further comprising:
   ranking the one or more groups based on a size of each group, wherein the size of each group is a number of frames in each group.

4. The method of claim 2, wherein identifying the one or more keyframes from the plurality of frames that include the object comprises computing a similarity score by a trained neural network, and wherein the trained neural network is trained on a plurality of images and text inputs.

5. The method of claim 4, wherein determining the set of reference masks corresponding to the user input and the object comprises:
   concatenating the selected image feature and the text feature to form a concatenated feature;
   performing a cross-modal encoding of the concatenated feature; and
   decoding, by a feature pyramid network, the concatenated feature to form an object mask.

6. The method of claim 2, wherein extracting, using the first machine learning model, the text feature from the user input comprises:
   parsing the user input into parts of speech;
   filtering the parts of speech to form an object vocabulary comprising nouns and pronouns; and
   localizing the plurality of image features using the object vocabulary.

7. The method of claim 1 further comprising presenting the final set of masks and the input video to a user via a graphical user interface.

8. A non-transitory computer-readable storage medium including instructions stored thereon which, when executed by at least one processor, cause the at least one processor to:
   receive a user input and an input video comprising a plurality of frames;
   generate a plurality of segmentation masks for the plurality of frames;
   determine a set of reference masks corresponding to the user input and an object;
   generate a set of fusion masks by combining the plurality of segmentation masks and the set of reference masks;
   propagate the set of fusion masks between the plurality of segmentation masks; and
   output a final set of masks for the input video.

9. The non-transitory computer-readable storage medium of claim 8, wherein the instructions to determine a set of reference masks corresponding to the user input and an object comprise instructions which, when executed by at least one processor, cause the at least one processor to:
   extract, using a first machine learning model, a text feature from the user input, wherein the text feature corresponds to an object;
   extract, using a second machine learning model, a plurality of image features from the plurality of frames, wherein a selected image feature corresponds to the object;
   identify one or more keyframes from the plurality of frames that include the object; and cluster one or more groups of the one or more keyframes that are within a threshold proximity to each other.

10. The non-transitory computer-readable storage medium of claim 9, the instructions further causing the processor to rank the one or more groups based on a size of each group, wherein the size of each group is a number of frames in each group.

11. The non-transitory computer-readable storage medium of claim 9, the instructions further causing the processor to identify the one or more keyframes from the plurality of frames that include the object by computing a similarity score by a trained neural network, and wherein the trained neural network is trained on a plurality of images and text inputs.

12. The non-transitory computer-readable storage medium of claim 11, wherein the instructions to determine the set of reference masks corresponding to the user input and the object comprise instructions which, when executed by at least one processor, cause the at least one processor to:
concatenate the selected image feature and the text feature to form a concatenated feature;
perform a cross-modal encoding of the concatenated feature; and
decode, by a feature pyramid network, the concatenated feature to form an object mask.

13. The non-transitory computer-readable storage medium of claim 9, wherein the instructions to extract, using the first machine learning model, the text feature from the user input comprise instructions which, when executed by at least one processor, cause the at least one processor to:
parsing the user input into parts of speech;
filtering the parts of speech to form an object vocabulary comprising nouns and pronouns; and
localizing the plurality of image features using the object vocabulary.

14. The non-transitory computer-readable storage medium of claim 8, the instructions further causing the processor to present the final set of masks and the input video to a user via a graphical user interface.

15. A system comprising:
a processor; and
a memory including instructions which, when executed by the processor, cause the system to:
receive a user input and an input video comprising a plurality of frames;
generate a plurality of segmentation masks for the plurality of frames;
determine a set of reference masks corresponding to the user input and an object;
generate a set of fusion masks by combining the plurality of segmentation masks and the set of reference masks;
propagate the set of fusion masks between the plurality of segmentation masks; and
output a final set of masks for the input video.

16. The system of claim 15, wherein the instructions which, when executed by the processor, cause the system to determine a set of reference masks corresponding to the user input and an object, further cause the processor to:
extract, using a first machine learning model, a text feature from the user input, wherein the text feature corresponds to an object;
extract, using a second machine learning model, a plurality of image features from the plurality of frames, wherein a selected image feature corresponds to the object;
identify one or more keyframes from the plurality of frames that include the object; and
cluster one or more groups of the one or more keyframes that are within a threshold proximity to each other.

17. The system of claim 16, the instructions further causing the processor to rank the one or more groups based on a size of each group, wherein the size of each group is a number of frames in each group.

18. The system of claim 16, the instructions further causing the processor to identify the one or more keyframes from the plurality of frames that include the object by computing a similarity score by a trained neural network, and wherein the trained neural network is trained on a plurality of images and text inputs.

19. The system of claim 18, wherein the instructions which, when executed by the processor, cause the system to determine the set of reference masks corresponding to the user input and the object, further cause the processor to:
concatenate the selected image feature and the text feature to form a concatenated feature;
perform a cross-modal encoding of the concatenated feature; and
decode, by a feature pyramid network, the concatenated feature to form an object mask.

20. The system of claim 16, wherein the instructions which, when executed by the processor, cause the system to extract, using the first machine learning model, the text feature from the user input further cause the processor to:
parse the user input into parts of speech;
filter the parts of speech to form an object vocabulary comprising nouns and pronouns; and
localize the plurality of image features using the object vocabulary.

* * * * *